C. FISCHER.
Centrifugal Sugar Draining-Machines.

No. 144,752.  Patented Nov. 18, 1873.

Witnesses,
Millard F. Walton,
Robert H. Hox.

Inventor:
Christoph Fischer.
by John A. Wiedersheim
att'ys.

UNITED STATES PATENT OFFICE.

CHRISTOPH FISCHER, OF GLOUCESTER, NEW JERSEY.

IMPROVEMENT IN CENTRIFUGAL SUGAR-DRAINING MACHINES.

Specification forming part of Letters Patent No. 144,752, dated November 18, 1873; application filed July 15, 1873.

*To all whom it may concern:*

Be it known that I, CHRISTOPH FISCHER, of the city of Gloucester, county of Camden, and State of New Jersey, have invented a new and useful Improvement in Centrifugal Sugar-Machines; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
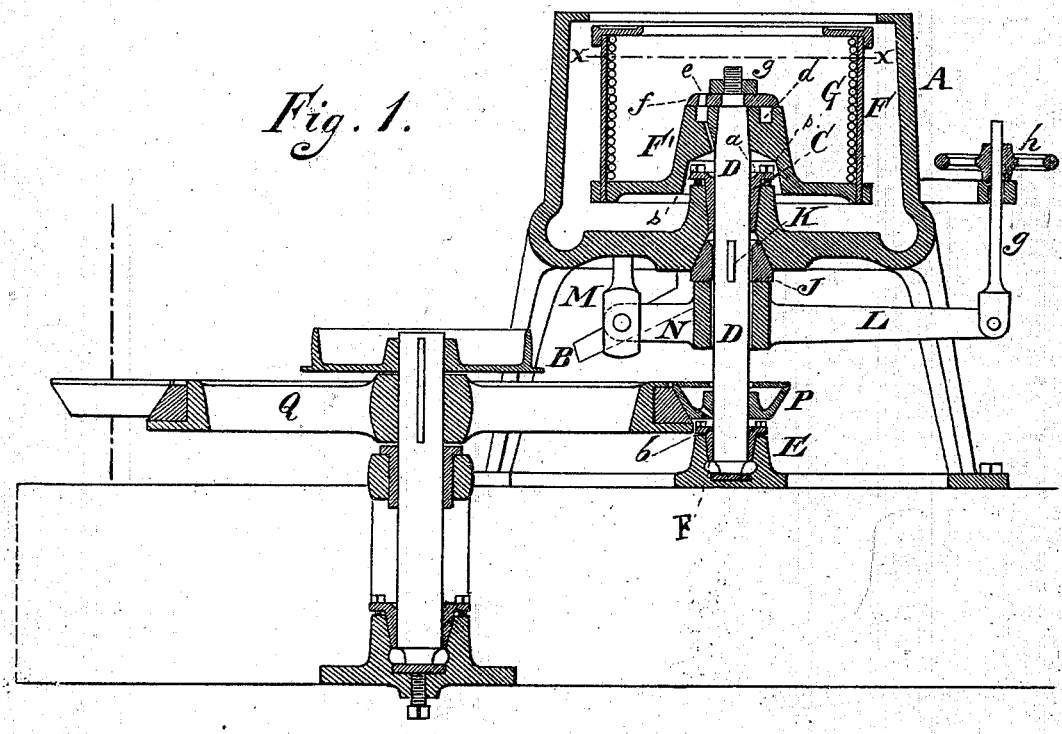
Figure 2:
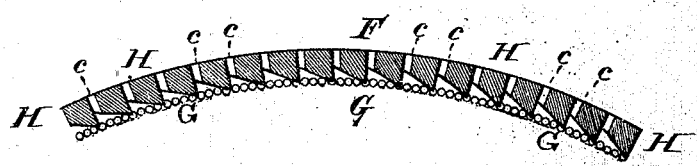

Figure 1 is a vertical central section of the device embodying my invention. Fig. 2 is an enlarged view of a portion in the horizontal section $x\,x$, Fig. 1.

Similar letters of reference indicate corresponding parts in the several figures.

This invention relates to apparatus for draining sugar; and consists in a friction-cone on the spindle of the machine, arranged to engage with the stationary cylinder which incloses the draining apparatus. It also consists in a bearing-block for the spindle, which block is of conical form and attached to the raised center of the cylinder, so as to firmly support the spindle below the basket, and be tightened in case of wear. It also consists in an oil-reservoir in the draining apparatus. It also consists in forming the cage surrounding the basket with vertical serrations, with an opening between the back of one tooth and the front of the adjacent tooth, so that when the molasses strikes the cage it cannot "jump" from one tooth to the other, but immediately passes out through the several openings. It also consists of a lever for simultaneously operating the friction-cone and cone-pulley, as hereinafter described.

Referring to the drawings, A represents the cylinder for receiving the molasses or sirup which is drained from the sugar and conveyed from the cylinder by means of a spout, or other appliance, B, properly located. This cylinder is suitably mounted on legs or feet, and has a raised center with an opening therethrough, which center is partly occupied by a box, C, through which passes a spindle, D, and which forms a bearing for said spindle. The box C and opening in the raised center are of conical form, and the former is attached to the latter by bolts $s\,s$, so that, in cases of looseness or wear, the box may be tightened and the proper bearing for the spindle always preserved. The upper portion of the box C is dished or cut out, as at $a$, and said box is firmly secured to the raised center of the cylinder A. The spindle D rests on a step, E, within which is placed a box, F, which encircles the spindle and has its upper side dished or cut out, as at $b$. The spindle carries the draining apparatus, which is inclosed by the cylinder A, as has been stated; and consists of the cage F and wire-basket G, which latter is shown by the circles which represent the wire of the basket. The inner periphery of the cage F is serrated or formed with triangular-shaped teeth H, the back of one tooth being adjacent to the front of the next tooth, and between the back and front is an opening, $c$, which extends through the wall of the cylinder A. The cage F is raised in its center, or formed with a hub, F', through which passes the spindle D, and said hub has a channel, $d$, on its upper end, which is covered by a plate, $f$, fitted on the spindle D and held against the hub F' by a nut, $g$, which also serves to tighten the cage on the spindle and firmly connect them. A small opening, $e$, is made in the plate $f$ and communicates with the channel $d$ in the hub F' of the cage F. Encircling the spindle D, just below the box C, is a friction-cone, J, which is rigidly secured to the spindle, as at K, so as to leave a space between the inner periphery of the cone and the outer periphery of the spindle. The lower portion of the opening of the raised center of the cylinder A is conical shaped, and adapted to engage with the friction-cone J. L represents a lever, whose fulcrum is on a hanger, M, attached to the cylinder A, or elsewhere. A portion of this lever is formed into a ring or boss, N, through which passes the spindle D, and against which rests the friction-cone J. The lever is adapted to be raised and lowered by means of a screw-rod, $g$, which is operated by the hand-wheel $h$, or other suitable appliance, and located within convenient reach of the workmen. Secured to the spindle D below the lever L is a friction-pulley, P, which may be channeled, or hollowed, or be grooved at the portion surrounding the spindle, so that there is a communication between the top and bottom of said pulley. A friction wheel or pulley, Q, is mounted on a proper shaft in juxtaposition to the pulley P, so as to impart motion or power to the latter pulley when the two pulleys are in contact, and thus drive the spindle D and the draining apparatus thereon. Power is communicated to the pulley Q in any desired manner.

When the device is in operation the sirup or molasses is driven by centrifugal force out of the wire-basket G, and strikes the backs of the serrations H of the cage F. The quantity that thus strikes the backs cannot pass beyond the same, but is at once directed out of the openings $c\ c$, between the serrations of the cage. Thus the sirup does not return into the cage or accumulate in such a manner as to collect in a measure at the bottom of the basket, whereby every portion of the sirup is driven out equally from top to bottom. The oil or lubricant is admitted to the channel $d$ of the raised center F′ of the basket, through the opening $e$ in the cap or plate $b$, and on rotation of the apparatus is in no danger of being thrown out into the basket. From this time the passage of the oil is below the basket, and there is no liability of flowing or being driven into the basket. The oil now passes through a duct communicating from the channel $d$ to the bottom of the raised portion, and by means of said duct is directed to the top of the box C; then flows between the box and spindle, between the friction-cone K, between the boss N of lever L; then to the friction-pulley P, and finally, between the box of the step E and the spindle, into the step. The proper lubrication of the spindle at the various points of bearing is accomplished, but the lubricant is deprived of all opportunity to be thrown into the sugar and sirup, and as all the machinery is below the draining-basket there is no danger of the collected dust and dirt of said machinery dropping into the basket. When the basket is being rotated the lever L is lowered, and the cone J is free from contact with the raised center of the cylinder A, and the pulley P is in contact with the pulley Q. The pulleys P and Q are not actually in contact with each other when at rest, but as soon as started there is a spring, or fly, or touch, resulting from centrifugal force, in consequence of which their faces are brought in contact.

When the apparatus is to be stopped the lever L is raised, which immediately brings the cone J against the stationary cylinder A, and simultaneously clears the pulley P from pulley Q. The friction between the cylinder A and cone J, and deprivation of power of the pulley P, acts quickly on the spindle D, and correspondingly stops the draining apparatus.

It will be seen that the friction-cone is arranged near the draining apparatus, so as to avoid twisting of the spindle and quickly stop the draining apparatus, and the place of engagement of the cone with the stationary cylinder is an enlargement of a portion of the opening through which the spindle passes, so that there is economy of space and simplification of the apparatus.

The bearings of the spindle are so constructed and disposed that the regular motion of the basket is always insured, and access thereto of substances other than the lubricant is entirely prevented.

I am aware of the patent to David M. Weston, dated September 8, 1868, and I do not claim the application of a spring to the upright shaft as the sole support of the machine; neither do I claim the application of the driving power below the floor. I am also aware of the patent to H. W. and R. Lafferty, dated August 16, 1870, and I do not claim suspending the vertical spindle upon a movable support; neither do I claim the combination of a friction-surface upon the drum with a counterpart friction-surface upon the casing when said drum moves in the line of its axis, as well as revolving thereon; neither do I claim a friction-clutch secured to a movable spindle in combination with a friction-pulley revolving upon a fixed hollow shaft; neither do I claim the combination of an annular cup-shaped nut with the lower end of a fixed hollow shaft and a friction-pulley; neither do I claim the combination of a friction-clutch with the spindle by means of an interposed sleeve; neither do I claim an elastic washer or packing interposed between the spindle and friction-clutch; neither do I claim the combination of a lever with the spindle in the manner shown in said invention; neither do I claim the combination of an eccentric with a lever; neither do I claim the combination of a movable frame carrying idle-pulleys with a lever; neither do I claim extensible links interposed between the arms of a lever and its eccentric on one side and a sliding frame on the other.

Having thus described my invention, what I claim as new, and desire to secure by Letters Patent, is—

1. The conical box C and conical opening in the raised center of the cylinder and bolts $s\ s$, in combination with the spindle D of a centrifugal machine supported below on a step, and having a bearing on the raised center of the cylinder A below the draining-basket, substantially as and for the purpose set forth.

2. The oil-reservoir $d$ in the raised center of the draining apparatus and covering-plate $f$, combined and operating as set forth.

3. The cage F, formed with vertical serrations H and perforations $c$ between them, when constructed and operating as set forth.

4. The lever L, having an axis suspended from the cylinder A, formed with a boss, N, which encircles the spindle D and bears against the friction-cone J, as herein set forth, for the purpose described.

The above signed by me this 28th day of June, 1873.

CHRISTOPH FISCHER.

Witnesses:
JOHN A. WIEDERSHEIM,
MILLARD F. WALTON.